Jan. 7, 1964 A. D. SEXTON 3,116,916
GAS-FIRED COMBINATION WASHER-DRIER
Filed Jan. 23, 1961 5 Sheets-Sheet 4

INVENTOR.
Arthur D. Sexton,
BY
William G. Landuyt
AGENT

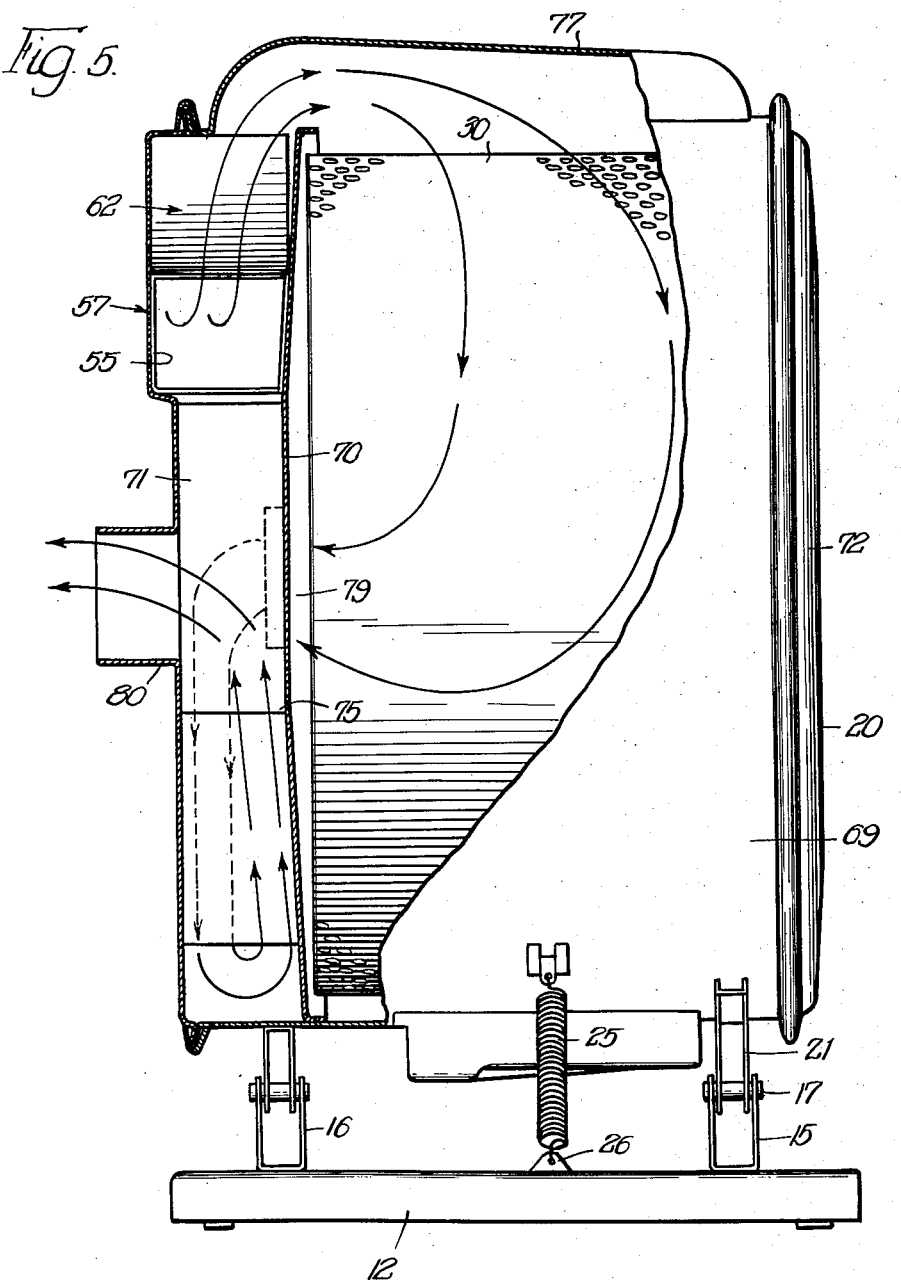

United States Patent Office 3,116,916
Patented Jan. 7, 1964

3,116,916
GAS-FIRED COMBINATION WASHER-DRIER
Arthur D. Sexton, Newton, Iowa, assignor to The Maytag Company, Newton, Iowa, a corporation of Delaware
Filed Jan. 23, 1961, Ser. No. 84,159
2 Claims. (Cl. 263—33)

This invention relates to a gas fired apparatus for the drying of fabrics, such as a combination washer-drier unit, and more particularly, to a combination assembly in a washer-drier system.

The invention relates specifically to a combination washer-drier in which the fabrics are tumbled during drying operations in a revoluble receptacle that is enclosed in a casing, or tub. Further, the present invention relates to an improvement in the type of combination washer-drier illustrated in the U.S. Patent 2,985,966 issued to Paul A. Martin on May 30, 1961 and assigned to the assignee of the instant invention. The casing is movably mounted in a spring system supported by a stationary supporting frame for absorbing the unbalanced centrifugal forces generated by the rotation of an unbalanced clothes load within the receptacle during fluid extraction operations. The problem is to efficiently and safely heat the revoluble receptacle within the movable casing by a gas fired burner.

If a gas burner is mounted on the movable casing, it must be connected to the gas line by a flexible tubing. This is unsatisfactory because of the inherent dangers in any flexible connection containing a natural gas in the environment of a home laundry. Alternatively, the burner may be mounted on the cabinet and the hot air introduced into the casing by a flexible conduit between the burner and the casing. This is also unsatisfactory, not only because of the inefficiencies in remotely heating, but also in the difficulties associated with the construction, and added costs, necessary to conduct the heat to the casing from the burner.

It is, therefore, an object of this invention to provide a gas fired burner for heating tumbled fabrics within a movable casing, or tub. It is a further object of the invention to provide a combustion system for a gas fired drying device, such as a combination washer-drier. It is a still further object to provide a gas fired burner for a drying apparatus that is economical in manufacture, yet efficient in operation. Further objects and advantages of this invention will become evident as the description proceeds and from an examination of the accompanying drawings which illustrate one embodiment of the invention and in which similar numerals refer to similar parts throughout the several views.

In the drawings:

FIGURE 5 is a diagrammatic view of the combination washer-drier of FIGURE 1 in vertical cross-section illustrating the path of air flow.

Figure 1:
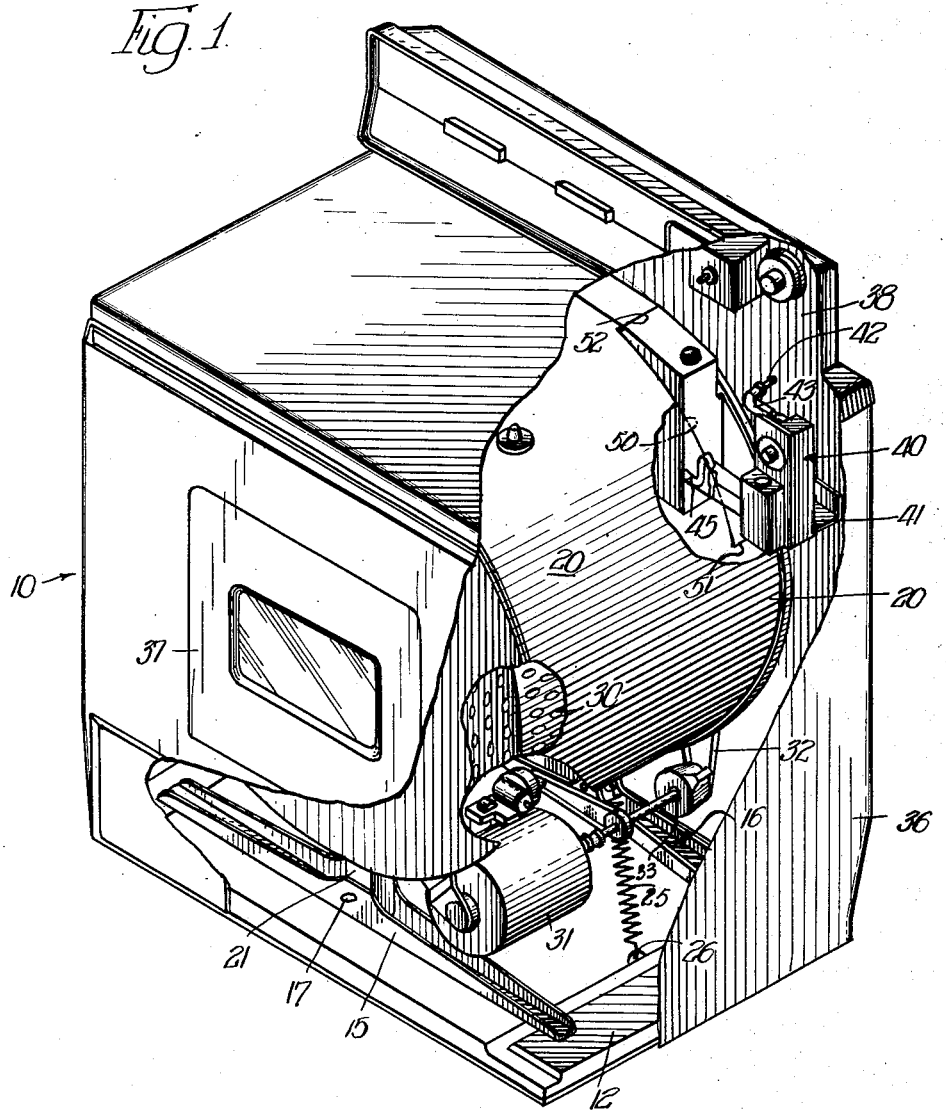
FIGURE 1 is a perspective view of a combination washer-drier embodying the present invention, partly broken away to illustrate the various elements of, and parts associated with, the present invention.
Figure 2:
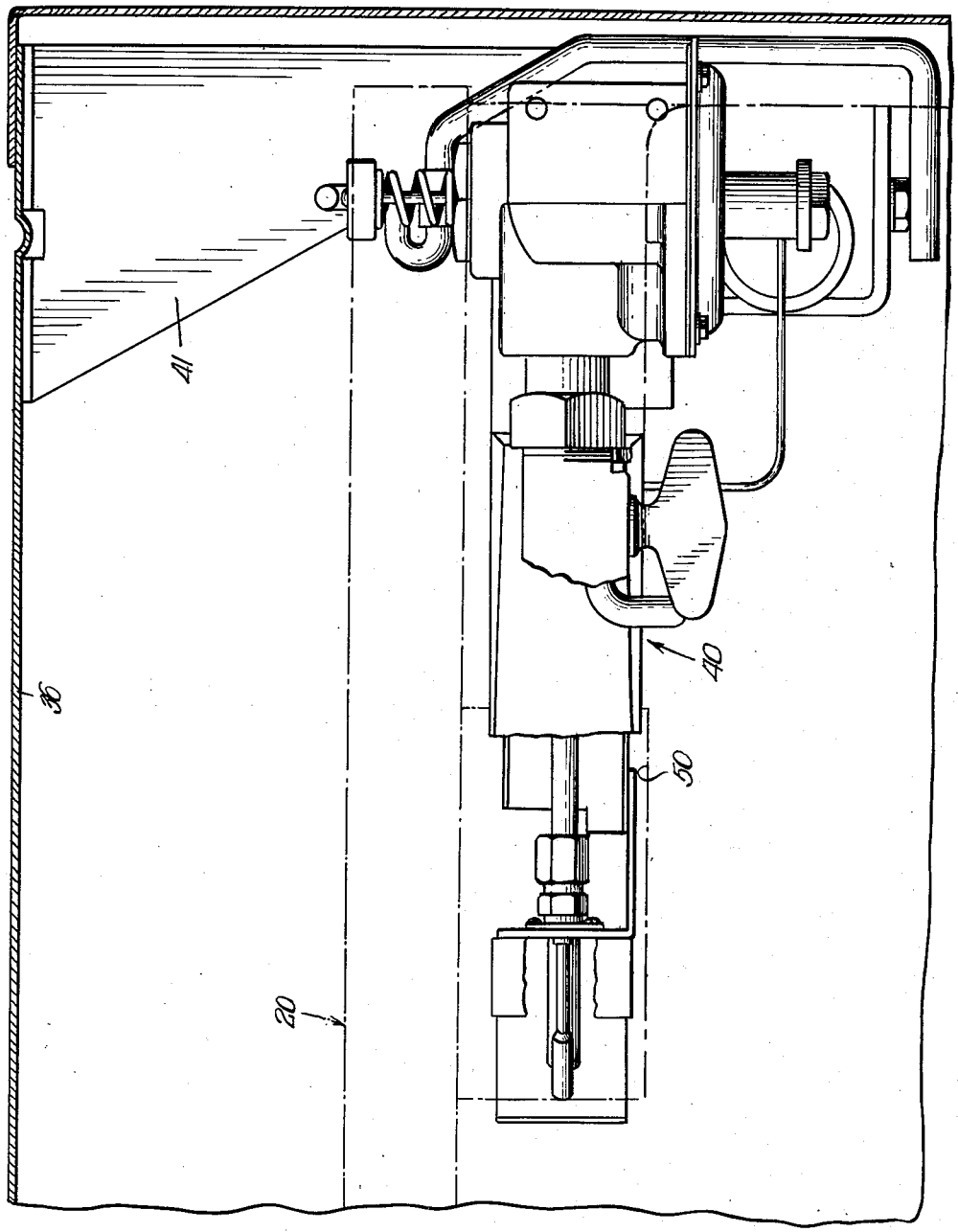
FIGURE 2 is a fragmentary enlarged plan view of the gas burner associated with the casing in the combination washer-drier unit.
Figure 3:
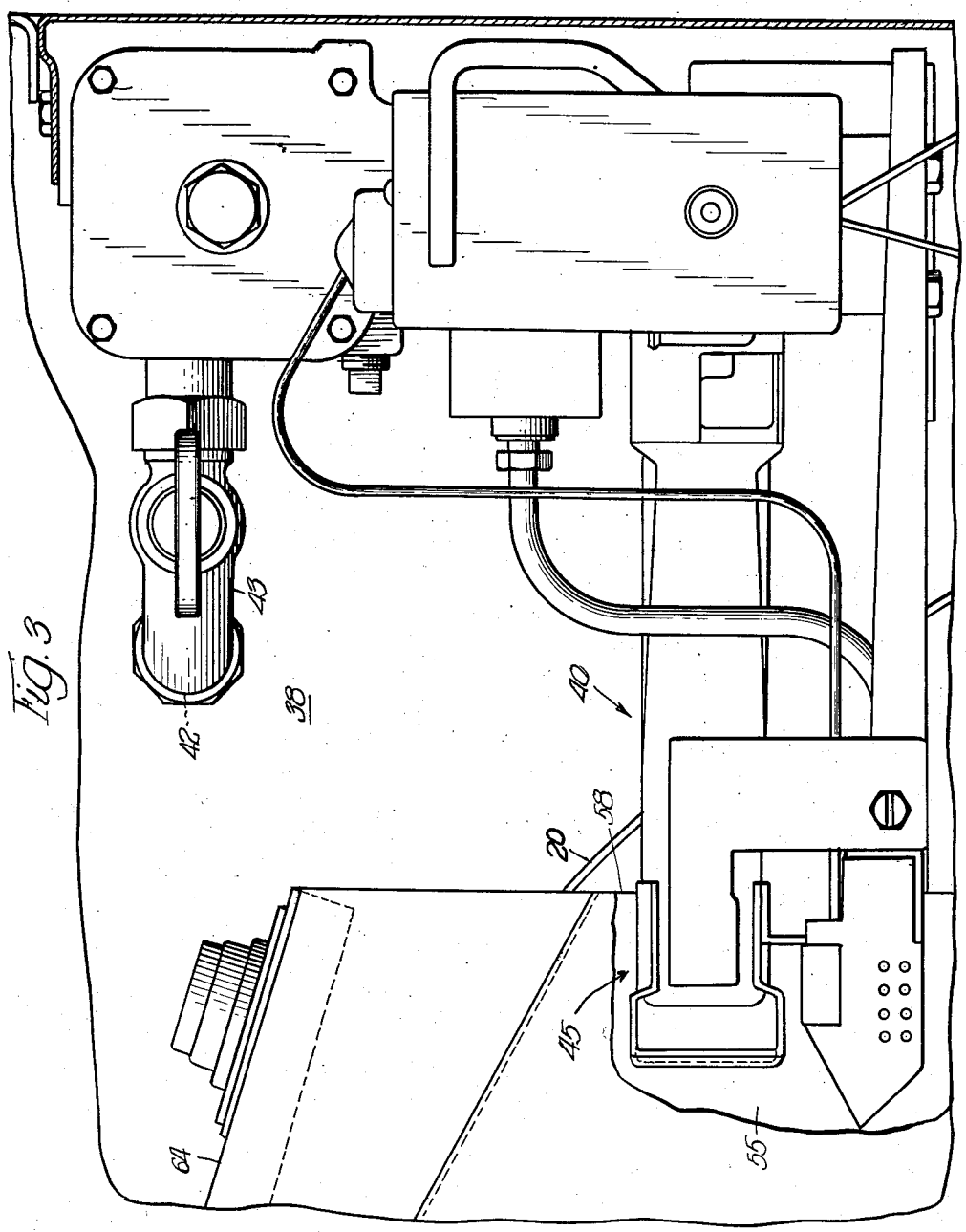
FIGURE 3 is a fragmentary enlarged side elevational view of the gas burner associated with the casing in the combination washer-drier unit.
Figure 4:
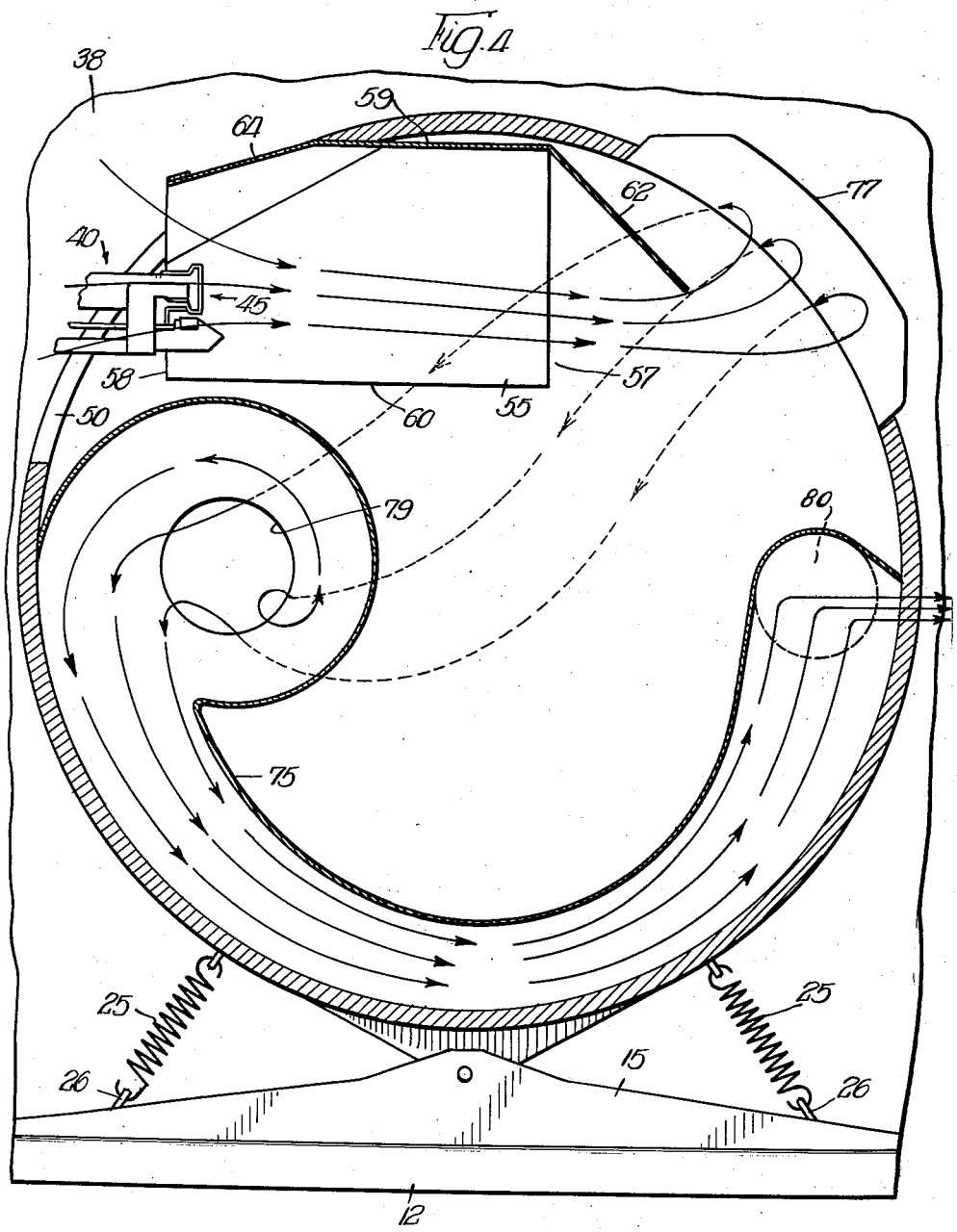
FIGURE 4 is a sectional view of the combination washer-drier unit of FIGURE 1, illustrating the path of air.

Referring now to the accompanying drawings, the combination washer-drier unit is designated generally by reference numeral 10. The combination unit is supported on a substantially flat surface base member 12.

Mounted upon base support 12 are channel members 15 and 16 which are securely affixed in some suitable manner to base support 12, such as by welding, to form the two major supports for the combination washer-drier unit illustrated in the drawings. While only channel member 15 will be described, it will be understood that channel 16 supports the combination unit in a similar manner to channel 15.

Channel 15 has a single pivot pin 17 about which the tub, or casing 20 is free to pivot in arcuate movement. Pivot pin 17 forms a pivot support for the tub bracket 21 and with the corresponding pivot and bracket on channel 16 forms a two point pivotal connection which allows the tub or casing 20 to oscillate back and forth on the pins in an arcuate movement in response to various forces generated therein.

The tub or casing 20 is maintained in an upright position on the pins by two opposite centering springs 25. The centering springs are connected between the side wall of the casing 20 and the base support 12 through the anchor brackets 26 fastened to the latter member.

Mounted within the tub or casing 20 is a rotatable clothes receptacle or basket 30. The basket is rotated by a motor 31 which drives pulley 32 through transmission unit 33.

A cabinet 36 is secured to and supported by the support member 12. A rectangular door 37 carrying a glass window is hinged on the cabinet for access to the revolvable basket or receptacle.

The gas burner assembly 40 is secured to the back wall 38 of the cabinet by a bracket 41. The brackets suspend the gas burner assembly adjacent the side wall of the tub or casing 20. The gas line 42 for the burner assembly may extend through the rear wall 38 of the cabinet 36.

Formed within the side wall of the casing or tub 20 is a long, narrow elongated opening 50 having spaced ends 51, 52 and having its longitudinal axis traversing the pivotal axis of the drum or casing 20 through the pin 17.

The gas burner assembly 40 has a gas nozzle 45 extending toward and projecting into the opening 50 in the side wall of the casing 20. The gas nozzle 45 is positioned at a point sufficiently spaced from the ends 51, 52 of the opening 50 so that the casing may rock on the pivotal axis of pin 17 in normal usage without the gas nozzle 45 contacting the casing 20. By allowing the gas nozzle 45 to extend horizontally along the arcuate path of movement of the casing, the gas flames can be contained within the casing during normal operations, and also during abnormal operations when the casing is pivoting about the axis of pin 17 due to forces generated by unbalanced load conditions.

Mounted in the casing 20 is a combustion chamber 55 having the general configuration of a rectangular box with open ends 57, 58 and top and bottom walls 59, 60. The open end 58 of the combustion chamber faces the outside of the elongated opening 50. The gas nozzle 45 of the gas burner assembly projects through the opening 50 into the combustion chamber 55, so that the opened flame of the gas fire is contained within the confines of the chamber 55 and prevents the flame from directly contacting any of the walls of the casing 20. In addition, a baffle 62 is mounted across the open end 57, in order to deflect the flame from the casing wall, in the event it should traverse the length of the chamber.

The top wall 59 may be bent downwardly at the portion 64 extending through the opening 50 to reduce the amount of the chamber 55 protruding through the opening.

Referring now to FIGURE 5, it will be noted that the casing 20 includes a generally cylindrical side wall 69, a pair of spaced rear walls 70, 71, and a front wall 72. The spaced rear walls 70, 71 form a compartment within which is mounted chamber 55. The lower portion of the same compartment may be used to contain a condenser unit, such as defined by duct work 75, for condensing moisture from the circulated air.

A conduit 77 mounted on casing 20 conducts the heated air from combustion chamber 55 to the rotatable basket 30.

The path of air flow in the combination washer-drier unit set forth herein is from the atmosphere through the opening 50 in casing 20, through combustion chamber 55, past gas nozzle 45, through conduit 77 and into receptacle 30. After traversing the clothes within the rotating receptacle, the air is removed through an opening 79 in wall 70 by a blower (not shown) disposed between walls 70 and 71 and revoluble about the central axis of opening 79 and the air then passes through duct work 75 to the exhaust opening 80.

In the drawings and specification there has been set forth a preferred embodiment of the invention, and although specific terms are employed, these are used in a generic and descriptive sense only, and not for purposes of limitation. Changes in form and the proportion of parts, as well as the substitution of equivalents are contemplated, as circumstances may suggest or render expedient, without departing from the spirit or scope of this invention as further defined in the following claims.

I claim:

1. In a combination washer-drier laundry apparatus, the combination comprising a supporting frame; a casing having front and rear walls interconnected by a generally tubular side wall; a partition coacting with said side wall for dividing said casing into a drying chamber and a compartment; a clothes receptacle revolubly mounted in said drying chamber on a non-vertical axis; means pivotally mounting said casing on said supporting frame for arcuate movement about a pivotal axis normally directly below the rotational axis of said receptacle; a combustion chamber within said compartment; inlet conduit means interconnecting said combustion chamber and said drying chamber; means for circulating and conducting air and moisture vapors from said drying chamber to an exhaust conduit; an elongated circumferential opening in said casing side wall adjacent said combustion chamber; and a gas burner rigidly mounted relative to said supporting frame and having a gas nozzle normally extending through the mid-point of said circumferential opening into said combustion chamber for heating the air circulated within the casing; and said opening having a circumferentially elongated configuration about said gas burner for preventing contact between said casing and said gas burner during pivotal movements of said casing due to acentric loads within said clothes receptacle.

2. A combination washer-drier laundry apparatus as set forth in claim 1 and wherein said gas nozzle normally extends into said combustion chamber at substantially right angles to a vertical plane through the pivotal axis of said casing.

References Cited in the file of this patent

UNITED STATES PATENTS

| | | |
|---|---|---|
| 2,662,764 | Arutunoff | Dec. 15, 1953 |
| 2,867,430 | Hullar | Jan. 6, 1959 |
| 2,869,345 | Strathearn et al. | Jan. 20, 1959 |
| 2,985,966 | Martin | May 30, 1961 |